(12) United States Patent
Maury et al.

(10) Patent No.: US 6,413,433 B1
(45) Date of Patent: Jul. 2, 2002

(54) METHOD FOR DEWATERING OF SLUDGE

(75) Inventors: Elise Maury, Paris; Livio Mattucci, Lyons, both of (FR); Fernando Urbani, Capena/Rome; Massimo Borelli, Lucca, both of (IT); John Sparapany, Bolingbrook, IL (US)

(73) Assignee: Nalco Chemical Company, Naperville, IL (US)

( * ) Notice: Subject to any disclaimer, the term of this patent is extended or adjusted under 35 U.S.C. 154(b) by 0 days.

(21) Appl. No.: 09/652,928

(22) Filed: Aug. 31, 2000

(51) Int. Cl.$^7$ .................................................. C02F 11/14
(52) U.S. Cl. ........................ 210/714; 210/728; 210/734; 210/790
(58) Field of Search ................................ 210/609, 714, 210/725, 727, 728, 734, 735, 790

(56) References Cited

U.S. PATENT DOCUMENTS

| | | | |
|---|---|---|---|
| 3,409,546 A | 11/1968 | Mogelnicki et al. | 210/728 |
| 3,414,514 A | 12/1968 | Buhl | 210/734 |
| 3,897,333 A | 7/1975 | Field et al. | 210/734 |
| 3,928,448 A | 12/1975 | Ballweber et al. | 260/567.6 P |
| 4,191,645 A | 3/1980 | Begala et al. | 210/734 |
| 5,234,604 A | 8/1993 | Liao et al. | 210/734 |
| 5,340,865 A * | 8/1994 | Neff et al. | 524/317 |
| 5,611,921 A * | 3/1997 | Deskins | 210/195.1 |
| 5,662,805 A * | 9/1997 | Cameron et al. | 210/709 |
| 5,792,366 A * | 8/1998 | Coville | 210/734 |
| 5,837,776 A * | 11/1998 | Selvarajan et al. | 525/244 |
| 5,938,937 A * | 8/1999 | Sparapany et al. | 210/728 |
| 5,993,668 A * | 11/1999 | Duan | 210/713 |
| 6,083,404 A * | 7/2000 | Sommese et al. | 210/723 |
| 6,171,505 B1 * | 1/2001 | Maury et al. | 210/727 |

FOREIGN PATENT DOCUMENTS

| | | |
|---|---|---|
| WO | WO 93/02966 | 2/1993 |

* cited by examiner

Primary Examiner—Peter A. Hruskoci
(74) Attorney, Agent, or Firm—Margaret M. Brumm; Thomas M. Breininger

(57) ABSTRACT

A process for dewatering of sludge, wherein said sludge comprises solids and water, comprising the steps of:

a) adding a cationic dispersion polymer and a microparticle to said sludge, wherein said cationic dispersion polymer can be added before or after or simultaneous with the addition of said microparticle; and b) physically separating said solids from said water.

7 Claims, No Drawings

METHOD FOR DEWATERING OF SLUDGE

FIELD OF THE INVENTION

The invention relates to a method for dewatering of sludge.

BACKGROUND OF THE INVENTION

A sludge is defined as a mixture of solids and liquids. Usually the liquid in a sludge is water and therefore, usually the desirable portion of the sludge is the liquid. Separation of the solids from the water in a sludge is a common chemical engineering unit operation that comes under the general heading of "water treatment" or "classic solids/liquid separation processes". More specifically, this separation of the solids from the water in a sludge is usually described as "dewatering" of the sludge.

To conduct solids/liquid separation during water treatment, suspended solids in the sludge are removed from water by a variety of processes, including sedimentation, straining, flotation, filtration, coagulation, flocculation, and emulsion breaking, among others. The amount of solids in sludges being dewatered ranges from as little as several parts per billion of solids to large amounts, up to and including, actual chunks of suspended solids or oils. Sludges being dewatered may contain from about 99.75 weight percent water to about 40 or 50 weight percent water. Obviously, the more water in the sludge, the more processing it takes in order to "dewater" the sludge. After a sludge has been dewatered, the liquid portion is usually processed further according to its intended end use, while the solids portion is typically properly disposed of in compliance with all applicable local, state and federal laws.

While strictly mechanical or physical means have been used to effect solids/liquid separation, modem chemical engineering methods typically rely on mechanical or physical separation techniques that are enhanced by the use of synthetic and natural cationic polymeric materials to accelerate the rate at which sludges can be dewatered. These solid-liquid separation processes include the treatment of sludges with cationic coagulant polymers that function to settle suspended inorganic particulates. Once settled out, the suspended inorganic particulates are readily removed from the liquid using mechanical or physical separation means. This separation of suspended inorganic particulate material makes the water usable for industrial or municipal purposes.

Dewatering of sludge is possible because particles in nature usually have either a cationic or anionic charge. Accordingly, these particles can be agglomerated, such that they can be readily physically separated from a liquid, by the addition to the sludge of a water-soluble coagulant or flocculant polymer having a charge opposite to that of the particles. This is referred to as a "polyelectrolyte enhanced solids/liquid separation process", wherein a water-soluble or water-dispersible ionically charged polymer is added to a sludge to neutralize the charged particles or emulsion droplets to be separated.

In a typical "polyelectrolyte enhance solids/liquid separation process", the dosage of these water-soluble or water-dispersible ionically charged polymers is critical to the performance of the process. Too little ionically charged polymer, and the suspended particles will not be charge neutralized and will thus still repel each other. Too much polymer, and the polymer will be wasted, or worse, present a problem in and of itself.

Lime or salts of iron or aluminum have been used to coagulate or flocculate solids; which facilitates the process of separation of these solids from sludge. There are known water-soluble or water-dispersible ionically charged polymers also used for this purpose. There are also known polymers that are of particular value as flocculants for suspensions of organic matter of a proteinaceous or cellulosic nature such as are to be found in sewage treatment effluents. In addition, there are synthetic polyelectrolytes, particularly certain cationic copolymers of acrylamide, that have been found to be of use in the field of sludge dewatering.

U.S. Pat. No. 3,409,546 describes the use of cationic polymers for dewatering of sludge. In this patent, the use of N-(amino methyl)-polyacrylamide polymers, is described in conjunction with other cationic polymers for the treatment of sewage sludges.

U.S. Pat. No. 3,414,514 describes the use of a copolymer of acrylamide and a quaternized cationic methacrylate ester for sludge dewatering.

Another class of cationic polymers used to dewater sludges is described in U.S. Pat. No. 3,897,333. The use of polyethyleneimines and homopolymers of cationic acrylates and methacrylates and other cationic polymers such as polyvinyl pyridines is also known.

Another example of a cationic polymer useful for sludge treatment is described in U.S. Pat. No. 4,191,645. In this patent, cationic copolymers prepared from a nonionic monomer, such as acrylamide, and a cationic monomer, such as trimethylammonium ethylmethacrylate methyl sulfate quaternary (TMAEM.MSQ) or dimethylaminoethylacrylate methyl sulfate quaternary (DMAEA.MSQ) are disclosed as being useful for sludge dewatering.

Further examples of polymeric treatments for sludge dewatering include the 1,4-dichloro-2-butene dimethylamine ionene chloride polymer disclosed in U.S. Pat. No. 3,928,448 and the block copolymers disclosed in U.S. Pat. No. 5,234,604.

Notwithstanding the variety of commercially available polymers that have been found to be capable of flocculating or coagulating sludges, there are various circumstances which tend to limit the usefulness of these reagents. While for certain sludges, economical treatments with these known reagents are feasible, more often sludges require very high and not cost effective dosages of reagents for successful treatment. Moreover, variations often occur in the composition of sludge from any one source. For example, variations in the supply of material to the sludge making process and/or in the oxidizing conditions that may be involved in the production of the sludge lead to a variety of particle types that must be removed. Furthermore, it is not uncommon to encounter sludges that are, for some reason, not amenable to flocculation by any of the known polymeric flocculating agents.

It is therefore desirable to provide additional chemical treatment materials and methods for the dewatering of sludge.

SUMMARY OF THE INVENTION

A process for dewatering of sludge, wherein said sludge comprises solids and water, comprising the steps of.
 a) adding a cationic dispersion polymer and a microparticle to said sludge, wherein said cationic dispersion polymer can be added before or after or simultaneous with the addition of said microparticle; and
 b) physically separating said solids from said water.

DETAILED DESCRIPTION OF THE INVENTION

Throughout this patent application, the following definitions will be used:

All percentages given for components of polymers are to be understood to mean "mol percent".

"AcAm" for acrylamide;

"DMAEA.BCQ" for dimethylaminoethyl acrylate.benzyl chloride quaternary salt (also known as ethanaminium, N-benzyl-N,N-dimethyl-2-((1-oxo-2-propenyl)oxy) chloride);

"DMAEA.MCQ" for dimethylaminoethyl acrylate.methyl chloride quaternary salt (also known as ethanaminium, N,N,N-trimethyl-2-((1-oxo-2-propenyl)oxy)chloride); and "DADMAC" for diallyldimethylammonium chloride;

"Excess sludge" refers to secondary biological sludge which needs to be removed from the system.

"IV" stands for intrinsic viscosity, which is RSV when the limit of concentration is equal to zero.

"Nalco" refers to the Nalco Chemical Company, One Nalco Center, Naperville, Ill. 60563, (630) 305–1000.

"RSV" stands for Reduced Specific Viscosity, which is an indication of polymer chain length and average molecular weight, which are indicative of the extent of polymerization during production. The RSV is measured at a given polymer concentration and temperature and calculated as follows:

$$RSV = \frac{[(\eta/\eta_0) - 1]}{c}$$

$\eta$ = viscosity of polymer solution
$\eta_o$ = viscosity of solvent at the same temperature
c = concentration of polymer in solution.

In this patent application, the units of concentration "c" are (grams/100 ml or g/deciliter). Therefore, the units of RSV are dL/g. For measuring RSV, the solvent used was 0.125 Molar sodium nitrate solution. The polymer concentration in this solvent was 0.045 percent. The RSV was measured at 30° C. The viscosities $\eta$ and $\eta_0$ were measured using a CannonUbbelohde semimicro dilution viscometer, size 75. The viscometer is mounted in a perfectly vertical position in a constant temperature bath adjusted to 30±0.02° C. The error inherent in the measurement of RSV is about 0.5 dL/grams. When two polymers have similar RSV's that is an indication that they have similar molecular weights.

"Rejects" are the lost fiber that is not suitable for the paper making process.

"Sludge" is defined as a mixture of water and solids.

The method of the instant claimed invention is a process for dewatering of sludge, wherein said sludge comprises solids and water, comprising the steps of:

a) adding a cationic dispersion polymer and a microparticle to said sludge, wherein said cationic dispersion polymer can be added before or after or simultaneous with the addition of said microparticle; and b) physically separating said solids from said water.

This improved method of sludge dewatering is applicable to any sludge from a papermill, a power plant and an industrial plant, wherein said industrial plant is selected from the group consisting of: refineries, manufacturing plants, chemical plants, food and beverage plants and other industrial facility that creates sludges. The preferred sludge is that from a papermill and the preferred papermill sludge is that sludge comprising: a mixture of primary and secondary (biological) sludge which also contains about 10% fibers, wherein said mixture of primary and secondary (biological) sludge consists essentially of:

1. Foam from deinking plant;
2. Sludge from machines;
3. Waste water from the cleaning process;
4. Rejects from the dissolved air flotation (hereinafter "DAF") units, and from the machines;
5. Rejects from the DAF units before the activated sludge plant; and
6. Excess sludge.

A variety of water soluble cationic dispersion polymer flocculants may be used in the practice of the invention. Both condensation and vinyl addition polymers may be employed. A preferred group of cationic polymers are those cationic dispersion polymers comprising acrylamide. In a preferred embodiment of the invention, the cationic dispersion polymers contain from about 10 mol % to about 80 mol % acrylamide. In a more preferred embodiment, the cationic dispersion polymers contain from about 30 mol % to about 60 mol % acrylamide.

In these cationic dispersion polymers comprising acrylamide, at least one other monomer must be copolymerized with the acrylamide. Typical of the cationic monomers that can be polymerized with acrylamide are the monomers DADMAC and DMAEA.MCQ. When these cationic acrylamide polymers are used they should have an RSV of at least about 3 dL/g and preferably the RSV should be within the range of from about 5 dL/g to about 20 dL/g. Cationic dispersion polymers useful in the process of the instant claimed invention include any of the following:

| Product Identifier | Actives (%) | Chemical Composition (in mol percent) of Polymers | RSV (dL/g) |
| --- | --- | --- | --- |
| A | 15 | 90% AcAm/10% DMAEA.BCQ | 17–22 |
| B | 20 | 65% AcAm/25% DMAEA.BCQ/ 10% DMAEA.MCQ | 15–25 |
| C | 20 | 20% AcAm/50% DMAEA.BCQ/ 30% DMAEA.MCQ | 10–20 |
| D | 25 | 90% AcAm/10% DMAEA.BCQ | 16–22 |
| E | 25 | 65% AcAm/25% DMAEA.BCQ/ 10% DMAEA.MCQ | 15–25 |
| F | 15 | 90% AcAm/10% DMAEA.MCQ | 13.5–21 |
| G | 20 | 70% AcAm/30% DADMAC | 3.5–6.5 |

All of these cationic dispersion polymers are available from Nalco.

Microparticles useful in the instant claimed invention are selected from the group consisting of:

| Product Identifier | Chemical Description |
| --- | --- |
| Red | colloidal silica |
| Orange | colloidal aluminium |
| Green | polyacrylic acid/acrylamide |
| Blue | naphthalene sulfonate formaldehyde, sodium sulfate |
| Purple | colloidal silica |
| Yellow | colloidal borosilicate |

All of these microparticles are available from Nalco.

In practicing the process of the instant claimed invention the dose is based on the solids loading in the sludge stream. The dosage of the microparticle and flocculant can typically range from about 5 ppm to about 500 ppm. However, in sludge streams having higher solids loading and/or excess dissolved solids, the dosages can be much higher.

It is possible to practice the instant claimed invention by first adding the microparticle and then adding the cationic dispersion polymer to the sludge. It is also possible to practice the instant claimed invention by first adding the cationic dispersion polymer and then adding the microparticle. It is preferred in practicing the instant claimed invention that the microparticle be added first to the sludge, followed by addition of the cationic dispersion polymer.

It is possible to conduct the method of the instant claimed invention by adding the microparticle and the cationic dispersion polymer simultaneously. If simultaneous addition is selected, it is preferred that the sludge is divided into at least two separate streams and the microparticle is added to one stream and the cationic dispersion polymer is added to the other stream. Later in time, the two streams are once again merged and mixed together. In this way the cationic dispersion polymer and the microparticle both have a chance to react with the ingredients in the sludge, before they have the opportunity to react with each other. The sludge may be divided into two separate streams by any technique known in the art, such as, but not limited to, moving the sludge through a pipeline with a baffle in the center of the pipe and having points of addition for the cationic dispersion polymer and the microparticle be on opposite sides of the baffle.

The claimed invention provides for increased sludge dewatering. In situations, for example with papermaking sludges, it is possible to recover useful materials from said dewatered sludge. In fact, it is possible, by using the process of the instant claimed invention to recover usable pulp from papermaking sludges.

Increased water separation and drainage from the sludge also increases cake dryness. Increases in cake dryness result in substantial cost savings related to energy, sludge transportation, incineration or landfill costs. Better dewatering also increases the clarity of filtrates from which the clarified sludge cake is removed. This leads to better opportunities to increase the system efficiency without sending excess solids back into the waste plant.

The following examples are intended to be illustrative of the present invention and to teach one of ordinary skill in the art how to make and use the invention. These examples are not intended to limit the invention in any way.

EXAMPLES

Preparation of Polymer Solution for Testing

A 2 gram (hereinafter "gm") sample of the dispersion polymer product is added to 198 gm of deionized or tap water and mixed at 800 rpm for 30 minutes using a cone drive mix motor fitted with a 1.5 inch diameter cage paddle. The resulting 1.0 percent solution produced by this method is then used without further dilution.

Preparation of Microparticle Solution for Testing

A 2 gm sample of the microparticle product is added to 198 gm of deionized or tap water and mixed by hand to dissolve and disperse the product. The resulting 1.0 percent solution is used without further dilution.

Drainage Test Procedure

Drainage testing involves treating a sample of a solids slurry or sludge with the microparticle and mixing the microparticle effectively so as to completely disperse the microparticle in the sludge by pouring the sludge from one beaker to another from about 5 to about 7 times. Then an aliquot of dispersion polymer solution is added with enough additional dilution water to bring the total sludge volume to 525 mL.

The dilution water is used to allow for a change in the individual amounts of microparticle solution and dispersion polymer added to the sludge, while keeping the total volume of microparticle solution, polymer solution and dilution water at 25 mL. The dispersion polymer is mixed with sufficient energy until effective flocculation occurs. Then the flocculated sludge-polymer mixture is poured onto a belt filter cloth and the volume of water drained at 5, 10 and 15 seconds is typically measured. The water drainage rate can be used as a relative performance measurement between polymers, polymer dosages, microparticles and microparticle dosages. The belt filter cloth is determined by the application and in general, the cloth which represents that used on the dewatering machine is used in this test to best simulate the actual dewatering. In general, the greater the water drainage, the more effective the treatment program.

The drainage testing performed to evaluate polymers of this invention requires placing 500 mL of the water/solids slurry, in a 1000 mL graduated beaker. An aliquot of the microparticle solution is added and mixed into the sludge sample by pouring the sludge from one beaker to another from about 5 to about 7 times. Then the dispersion polymer solution and dilution water are added and effectively mixed to flocculate the solids and generate free water. The total volume of water and flocculated solids are then poured onto a belt filter cloth and the water drainage is recorded at about 15 seconds for comparison.

The sludge type tested in these examples is from a papermill (specifically a tissue mill). The sludge contains a mixture of primary and secondary (biological) sludge with 10% fibers as well. The sludge contains any or all of the following:

1. Foam from deinking plant
2. Sludge from the two machines
3. Waste water from the cleaning process
4. Rejects from the DAF units, from the machines
5. Rejects from the DAF units before the activated sludge plant Example 1

Effect of Microparticle on Free Drainage at Constant Polymer Dosage (50 and 100 ppm).

In this Example the cationic dispersion polymer used is 20% AcAm/50% DMAEA.BCQ/30% DMAEA.MCQ. The microparticle used is 99 mol % polyacrylic acid/1 mol percent acrylamide. The microparticle is added first, followed by the cationic dispersion polymer. Drainage volume is the volume of water collected (free drainage) during 15 seconds when 500 mL of sludge are poured into a filter using a standard "test defined" filter cloth. All Drainage Volume test results are reported in mL. The type of filter cloth is defined by the application and dewatering machine used for dewatering the solids.

| Polymer Dosage (ppm) | Microparticle Dosage (ppm) | Drainage Volume at 15 sec. (mL) |
|---|---|---|
| 50 | 0 | 238 |
| 50 | 40 | 330 |
| 50 | 60 | 330 |
| 50 | 100 | 341 |
| 100 | 0 | 315 |
| 100 | 60 | 340 |
| 100 | 100 | 340 |

Example 2
Effect of Microparticle on Free Drainage at Constant Flocculant Dosage (50 and 100 ppm).

The cationic dispersion polymer and the microparticle are the same as those used in Example 1. The test is conducted in the same manner as is the test conducted in Example 1. The results are shown in the following table:

| Polymer Dosage (ppm) | Microparticle Dosage (ppm) | Order of Addition | Drainage Volume at 15 sec. (mL) |
|---|---|---|---|
| 50 | 0 | Not Applicable | 238 |
| 50 | 60 | Polymer first, then Microparticle | 330 |
| 50 | 60 | Microparticle first, then Polymer | 336 |

In both examples, using the combination of the cationic dispersion polymer and the microparticle provides for better dewatering than does using the cationic dispersion polymer by itself.

Changes can be made in the composition, operation and arrangement of the method of the present invention described herein without departing from the concept and scope of the invention as defined in the following claims:

We claim the following:

1. A process for dewatering of sludge, wherein said sludge comprises solids and water, comprising the steps of:
   a) adding a cationic dispersion polymer and a microparticle to said sludge, wherein said cationic dispersion polymer is added to said sludge simultaneous with the addition of said microparticle; and
   b) physically separating said solids from said water; wherein said sludge is divided into two separate streams by moving it through a pipe with a center baffle, and wherein said cationic dispersion polymer is added to said sludge on one side of said baffle and said microparticle is added to said sludge on the other side of said baffle and after both said cationic dispersion polymer and said microparticle are simultaneously added to said sludge, the two separate sludge streams are rejoined into one streams.

2. The process of claim 1 wherein said sludge is selected from the group consisting of sludge from a papermill, a power plant and an industrial plant; wherein said industrial plant is selected from the group consisting of refineries, manufacturing plants, chemical plants, food and beverage plants and any other industrial facility that creates sludges.

3. The process of claim 1 wherein said sludge is sludge from a papermill.

4. The process of claim 1 wherein said cationic dispersion polymer is selected from the group consisting of 90%AcAm/110% DMAEA.BCQ;

65%AcAm/25%DMAEA.BCQ/10%DMAEA.MCQ;

20%AcAm/50%DMAEA.BCQ/30%.DMAEA.MCQ;

90%AcAm/10%DMAEA.BCQ;

65%AcAm/25%DMAEA.BCQ/10%DMAEA.MCQ;

90%AcAm/10%DMAEA.MCQ; and

70%AcAm/30%DADMAC.

5. The process of claim 4 wherein said cationic dispersion polymer is 20% AcAm/50/%DMAEA.BCQ/30%DMAEA.MCQ.

6. The process of claim 1 wherein said microparticle is selected from the group consisting of colloidal silica, colloidal borosilicate, colloidal aluminum, polyacrylic acid/acrylamide, and naphthalene sulfonte formaldehyde/sodium sulfate.

7. The process of claim 6 wherein said microparticle is 99 mol % polyacrylic acid/1 mol % acrylamide.

* * * * *